(12) United States Patent
Martelli et al.

(10) Patent No.: US 11,433,499 B2
(45) Date of Patent: Sep. 6, 2022

(54) OPTOELECTRONIC APPARATUS FOR CHECKING MECHANICAL PARTS, AND RELEVANT PROTECTION DEVICE

(71) Applicant: Marposs Societa' Per Azioni, Bentivoglio (IT)

(72) Inventors: Samuele Martelli, Castello d'Argile (IT); Matteo Venturi, Imola (IT)

(73) Assignee: Marposs Societa' Per Azioni, Bentivoglio (IT)

( * ) Notice: Subject to any disclaimer, the term of this patent is extended or adjusted under 35 U.S.C. 154(b) by 454 days.

(21) Appl. No.: 16/618,575

(22) PCT Filed: Jun. 11, 2018

(86) PCT No.: PCT/EP2018/065367
§ 371 (c)(1),
(2) Date: Dec. 2, 2019

(87) PCT Pub. No.: WO2018/228998
PCT Pub. Date: Dec. 20, 2018

(65) Prior Publication Data
US 2020/0156201 A1    May 21, 2020

(30) Foreign Application Priority Data
Jun. 12, 2017    (IT) .................... 102017000064533

(51) Int. Cl.
*B23Q 17/24*    (2006.01)
*G01B 11/00*    (2006.01)
(Continued)

(52) U.S. Cl.
CPC .......... *B23Q 17/2485* (2013.01); *G01B 11/00* (2013.01); *G01N 21/15* (2013.01); *G02B 27/0006* (2013.01); *G01N 2021/151* (2013.01)

(58) Field of Classification Search
CPC .... B23Q 17/2485; G01B 11/00; G01N 21/15; G01N 2021/151; G02B 27/0006
See application file for complete search history.

(56) References Cited

U.S. PATENT DOCUMENTS 3,749,500 A    7/1973    Carlson et al.
3,912,925 A    10/1975    Gaskell
(Continued)

FOREIGN PATENT DOCUMENTS

DE    103 37 242 A1    3/2005
EP    0 098 930 A2    1/1984
(Continued)

*Primary Examiner* — Michael A Lyons
*Assistant Examiner* — Jarreas C Underwood
(74) *Attorney, Agent, or Firm* — Blank Rome LLP

(57) ABSTRACT

An apparatus for checking mechanical parts such as tools on machine tools employs optical devices for emitting and receiving a light beam, for example a laser beam, along a checking direction, and sensors for detecting variations in the features of such a light beam. A protection device (15) for at least one of the optical devices comprises a support element (21,22) with an inner seat (20), communication conduits (18,26,34) aligned along the checking direction and a shutter (44) movable, in the internal seat, from a rest position to an operative position of the apparatus. The shutter comprises a transversal through hole (60) which is arranged along the checking direction in the operative position, aligned with the communication conduits to allow the light beam to pass through. A movable closure element (55), for example a small sphere or ball, is arranged in a transversal hollow (54) of the shutter and is pushed by a spring towards the outside of the transversal hollow. In the rest position of the apparatus, the transversal hollow is arranged along the checking direction and the movable closing element partially protrudes and cooperates with a
(Continued)

gasket at the inlet of one of the communication conduits, to prevent the entry of foreign material and fluids into the optical device.

10 Claims, 3 Drawing Sheets

(51) Int. Cl.
*G01N 21/15* (2006.01)
*G02B 27/00* (2006.01)

(56) References Cited

U.S. PATENT DOCUMENTS 5,684,624 A * 11/1997 Wieber .................... G02B 7/16
                                                                359/821
6,003,414 A * 12/1999 Hsieh .................. B25B 23/0014
                                                               81/177.85

FOREIGN PATENT DOCUMENTS

| EP | 1 050 368 A1 | 11/2000 | |
|----|---|---|---|
| EP | 2 207 643 A1 | 7/2010 | |
| FR | 2 343 555 A1 | 10/1977 | |
| WO | WO 2009/034147 A1 | 3/2009 | |
| WO | WO-2009034147 A1 * | 3/2009 | ............. B23Q 17/20 |

* cited by examiner

OPTOELECTRONIC APPARATUS FOR CHECKING MECHANICAL PARTS, AND RELEVANT PROTECTION DEVICE

TECHNICAL FIELD

The invention relates to an optoelectronic device for checking mechanical parts, for example for checking the dimensions, position or integrity of tools, with optical devices, in particular an emitter and a receiver aligned along a checking direction and adapted to emit and receive, respectively, a light beam, and a protection device for at least one of the optical devices, the protection device comprising a movable shutter.

The invention also relates to a protection device for an optical device suitable for emitting or receiving a light beam, comprising a movable shutter.

BACKGROUND ART

Optoelectronic devices are known to verify the dimensions or the presence, the arrangement and possible breakages of mechanical parts, for example of tools on machine tools. Such devices can use light beams and, for example, detect the interruption of the beam, or acquire a profile of the mechanical part and make appropriate measurements on this profile.

U.S. Pat. No. 3,912,925 discloses, for example, a drilling machine in which devices for checking the integrity of the tools employ transversal light beams which have limited thickness and are substantially coplanar with respect to the feed direction of the tools. The non-interruption of a light beam at a specific position of the tool is detected, and notifies an anomalous condition of the tool.

U.S. Pat. No. 3,749,500 shows different applications of optical gauges for checking dimensions (diameters of cylindrical pieces) or wear of tools (FIG. 17).

Other checking apparatuses that employ a light beam and detect its interruption are known from other patent documents, such as publications No. FR-A-2343555, EP-A-0098930, EP-A-1050368, DE-A-10337242 and EP-A-2207643.

In the optical and optoelectronic apparatuses, component parts such as lenses, mirrors, photodiodes, etc., are needed to be protected against dust and other foreign materials. This need is particularly pressing in optoelectronic apparatuses which must operate in industrial environments, for example for checking, with high standards of accuracy, dimensions of pieces in the environment where such pieces are processed.

In the checking apparatuses using a light beam and operating in a workshop environment, the presence of dirt located at the emitter and/or the receiver affects the correct reception of the emitted light beam in a direct and hard way, and thus affects the correct operation of the apparatus. Such a problem is faced and partly solved in different ways. As disclosed in patent publications No. DE-A-10337242 and EP-A-2207643, there can be movable mechanical protections such as sliding shutters that uncover the optical devices only during the time interval in which the checking is carried out. In such a way, in the course of the machining, the optical device is mechanically protected and the propagation conduit of the light beam cannot be reached by the chips.

However, the shielding represented by the mobile shutter, which must be able to slide along the inner wall where the light beam propagation conduit opens, provides in some cases an insufficient protection. In fact, it cannot guarantee the seal to liquids, and cooling splashes or drops may reach the optics.

There can be also included cleaning nozzles blowing compressed air on the glasses of the casings that house the optical devices, as mentioned and shown for example in patent applications No. EP-A-0098930 and EP-A-1050368. The latter document also shows different solutions, wherein an optical device comprises a mechanical protection or screen with a conduit for allowing the light beam in output (in case of the emitter) or in input (in case of the receiver) to pass through, and a pneumatic circuit blowing compressed air outwards from said casing through said conduit for preventing the dirt or other foreign material from penetrating through the conduit and reaching the optical device.

Documents no. U.S. Pat. No. 3,749,500, DE-A-10337242 and EP-A-2207643 also comprise the implementation of pressurized units housing the optical devices. EP-A-2207643 shows and describes a protection device which comprises, in addition to a mobile mechanical protection element, or shutter, a pneumatic system with a particular nozzle having different conduits around the one crossed by the light beam which generate a flow of air in form of a tubular protective shield around the light beam. The device provides that, in a non-operative condition in which the movable shutter closes the conduit crossed by the light beam but cannot guarantee a sealed closure, low-flow air is blown to pass through and escape from said conduit. In such a way dirt or other foreign material is prevented from being deposited on the external surface of the optical device (emitter or receiver) in the non-operating phase. This solution ensures proper protection as long as the airflow persists but can create problems, for example in the event of a power failure or during periods when the apparatus is not powered, for example during the weekends. In this case, in fact, nothing prevents the refrigerant which could be kept sprayed and/or the one previously dispensed and present on the walls of the machine and the apparatus to penetrate and dirt the optics.

DISCLOSURE OF THE INVENTION

Object of the present invention is to provide an optical checking apparatus employing a light beam, which guarantees excellent performance and is particularly reliable even in the workshop environment, overcoming the problems of the known apparatuses in particular with regard to the protection of the optical devices.

This and other objects and advantages are achieved by an apparatus according to claim 1, and by a protection device according to claim 7.

BRIEF DESCRIPTION OF THE DRAWINGS

The invention will now be described with reference to the attached drawings, given by way of non-limiting example, in which.

BEST MODE FOR CARRYING OUT THE INVENTION

Figure 1:
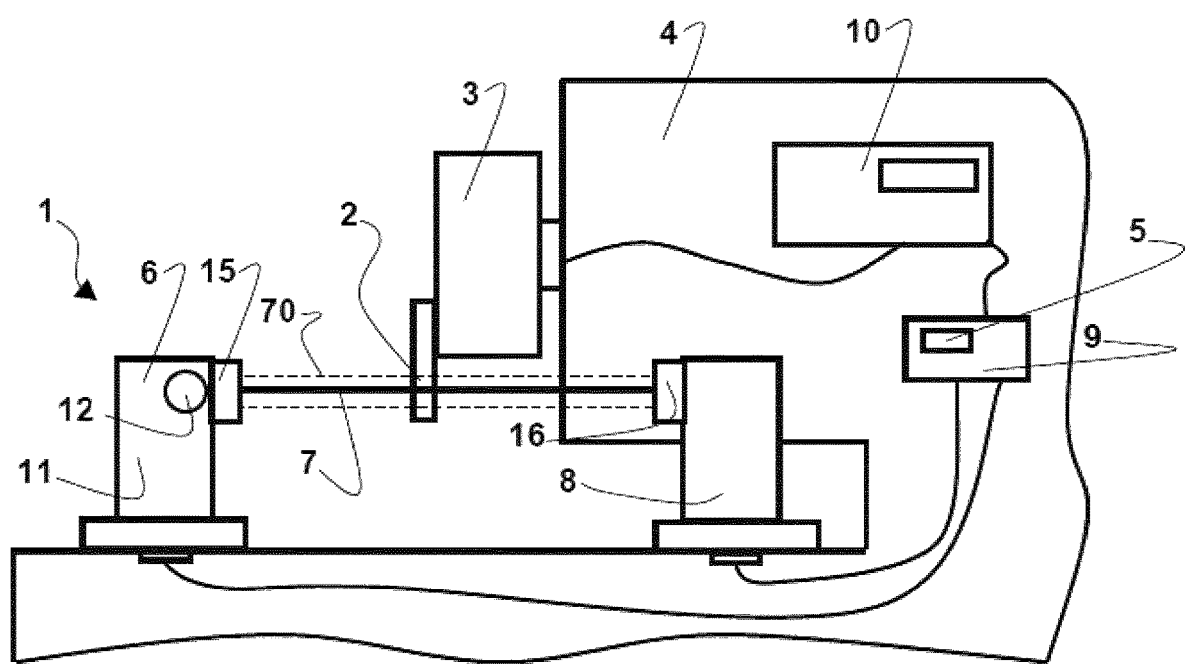
FIG. 1 is a highly schematic side view of a checking system comprising an optoelectronic apparatus according to the invention.

FIG. 1 shows, in a very simplified way, a checking system with an optoelectronic apparatus 1 according to the present invention during the checking of a mechanical part 2, in particular a tool arranged in the turret 3 of a lathe 4, whereto the apparatus 1 is coupled.

The apparatus 1 includes optical devices, in particular an emitter 6, i.e. a device for generating and transmitting a light beam 7, for example a laser beam, along a checking direction, and a receiver 8, arranged along said checking direction, which receives the light beam 7. A processing unit 9 is electrically connected to the emitter 6 and to the receiver 8, and includes, among other things, a sensor 5 which detects variations in the features of the received light beam 7, more specifically it detects whether the light beam 7 is received by the receiver 8 or is not received owing to the interruption of the light beam 7. The system includes a control unit 10, connected to the processing unit 9, which controls the machining movements of the lathe 4 in a known way, by means of suitable activation devices that are known as well, and thus not illustrated in the figure.

The emitter 6 includes a casing 11 which houses, among other things, a light source 12, and a protection device 15, or shutter assembly, which is shown, in different working moments, in FIGS. 2 to 5.

The shutter assembly 15 essentially includes three elements: a support element or shell 22, a nozzle 33, and a shutter 44.

Figure 2:
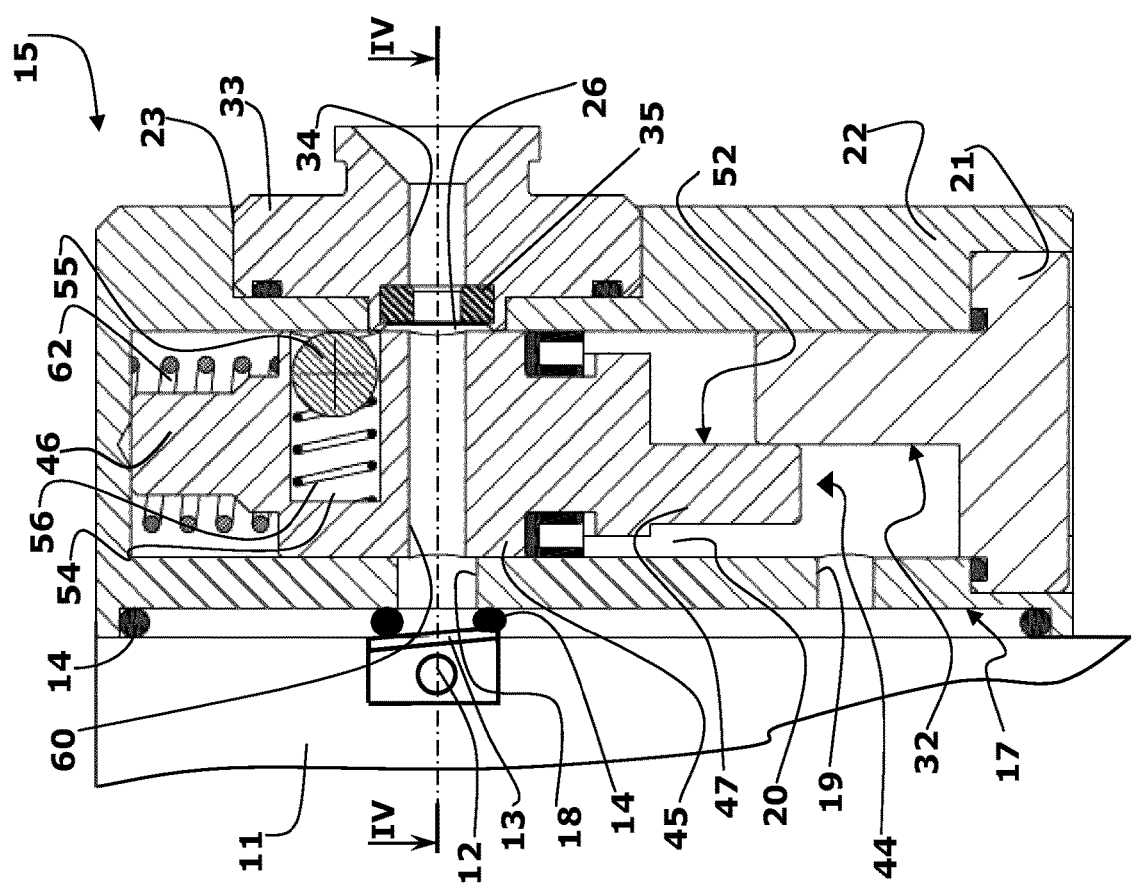
FIG. 2 is a cross-section of a protection device for an optical device of an apparatus according to the invention, shown in a first operating condition, connected to the relative optical device.
Figure 5:
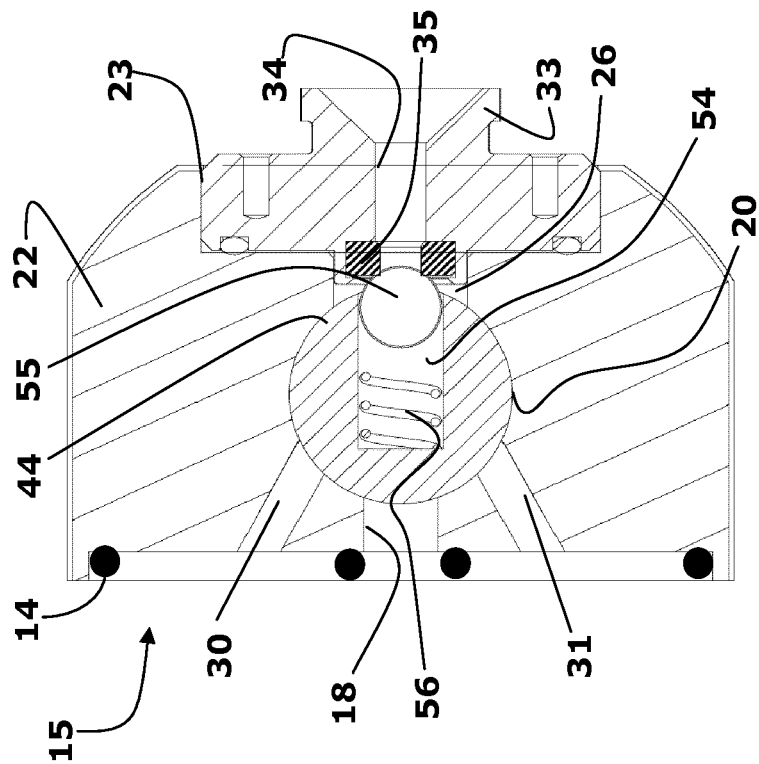
FIG. 5 is a cross-section of the protection device of FIG. 3, along the line V-V of FIG. 3.
Figure 4:
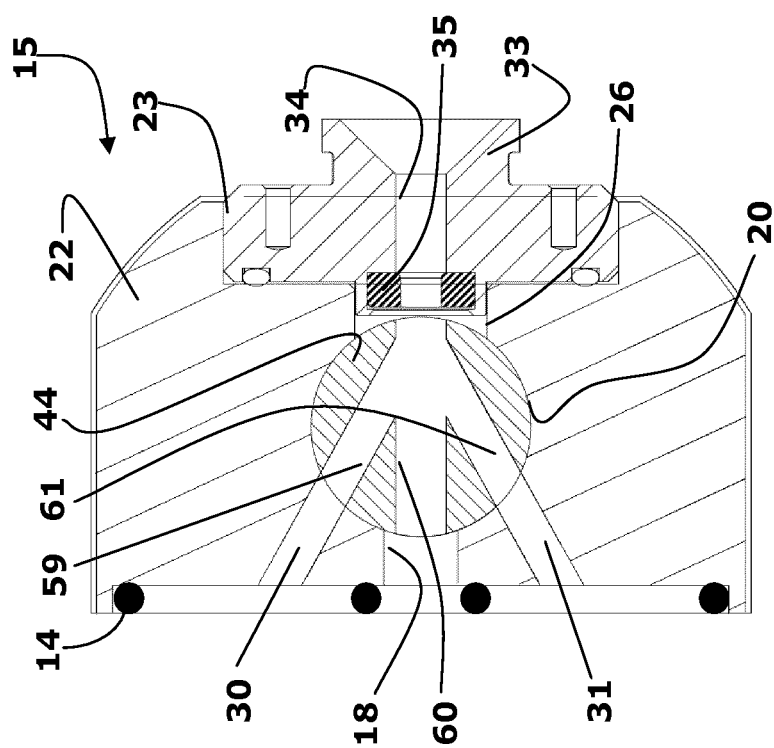
FIG. 4 is a cross-section of the protection device of FIG. 2, along the line IV-IV of FIG. 2.

The shell 22 is connected to the casing 11 of the emitter 6 and includes an end wall 17, facing the casing, with a first communication conduit 18 aligned with the light source 12, in particular communicating with a transparent wall 13, for example a protection glass covering the light source 12. FIG. 2 shows in a simplified way a portion of the casing 11 whereto the protection device 15 is coupled, and also the light beam 12 and the glass 13. A sealing member 14 is placed between the end wall 17 and the casing 11, and includes different sealing profiles, among which an annular profile located at the glass 13. Feeding conduits 30 and 31, visible in FIGS. 4 and 5, are in communication with a source of compressed air—or other gas. The feeding conduits 30 and 31 and an additional conduit 19 in the wall communicate with a longitudinal internal seat 20, substantially cylindrically shaped, of the shell 22. A closing and antirotation element 21—forming a part of the support element—closes an end of the shell 22 and defines a stationary guide surface 32, substantially plane, for the shutter 44. A seat 23, substantially cylindrically shaped, for the nozzle 33 is arranged facing the first communication conduit 18. A second communication conduit 26 is present between the seat 23 and the longitudinal internal seat 20, and is aligned with the first communication conduit 18 along the checking direction of the apparatus.

The nozzle 33 is housed and fixed, for example by interlocking or by means of screws (as schematically shown in FIGS. 4 and 5), in the seat 23 of the shell 22 and presents an axial communication conduit 34 which is arranged aligned with the first 18 and the second 26 communication conduit along the checking direction. At the second communication conduit 26, the mouthpiece of the axial communication conduit 34 has an enlargement which houses an annular sealing gasket 35.

The shutter 44 comprises a substantially cylindrical main body 45 and abutment end portions 46 and 47. The shutter 44 is housed in the inner longitudinal seat 20 of the shell 22 in which it can slide with small clearance between a rest position (FIGS. 3, 5) defined by the longitudinal abutment between surfaces of the abutment end portion 47 and the closing and anti-rotation element 21, and a working position (FIGS. 2, 4) defined by the abutment between the abutment end portion 46 and an inner surface of the shell 22. A compression spring 62 is housed in the seat 20 and pushes the shutter 44 into the rest position. A transversal guide surface 52 of the portion 47 and the stationary guide surface 32 of the closing and antirotation element 21 mutually cooperate to guide the longitudinal displacements of the shutter 44 in the seat 20 and prevent the shutter 44 from rotating around a longitudinal axis.

The body 45 comprises a transversal through hole 60 defining an axis parallel to the checking direction, two oblique holes 59 and 61 (FIG. 4) which converge into the transversal through hole 60 along oblique directions with respect to the checking direction, and a transversal hollow 54, typically cylindrical with a symmetry axis substantially parallel to the checking direction, with one closed end by the side facing the end wall 17 of the shell 22 and an open end on the opposite side. A movable closing element 55, typically a small sphere or ball, is arranged in the transversal hollow 54 and a thrust device 56, typically a compression spring arranged between the closed end of the transversal hollow 54 and the movable closing element 55, pushes the latter to escape through the open end. The transversal through hole 60 and the transversal hollow 54 are designed to be arranged, in two different operating phases of the apparatus, in line with the first communication conduit 18 and with the axial communication conduit 34 of the nozzle 33, that is to the checking direction. When the transversal through hole 60 is aligned with the first communication conduit 18 (FIGS. 2 and 4) the oblique holes 59, 61 are aligned with the feeding conduits 30, 31.

The operation of the apparatus 1, as regards the protective device, or shutter assembly, 15, is as follows.

Figure 3:
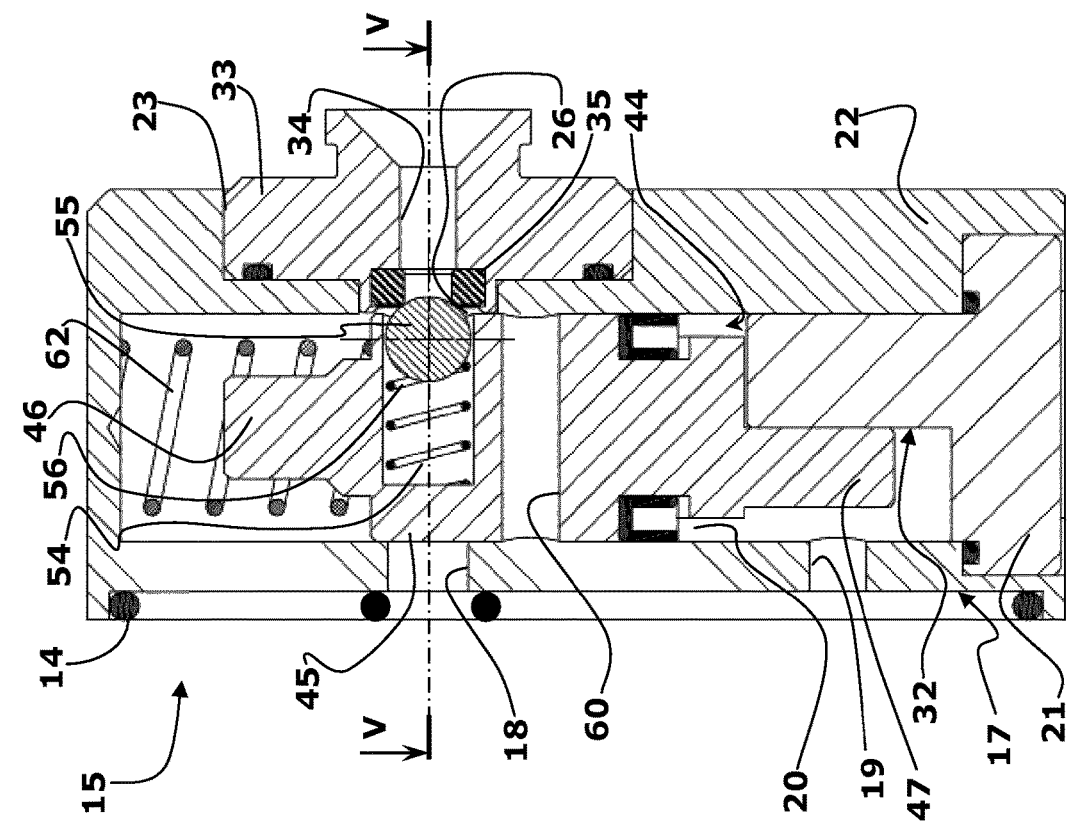
FIG. 3 is a cross-section of the protection device of FIG. 2, in a second operating condition.

During the machining operations of a mechanical part (not shown in the figures) in the machine tool 4, the shutter 44 is in the rest position, shown in FIGS. 3 and 5, defined by the longitudinal abutment of the abutment portion 47 on the closing and antirotation element 21. In the embodiment of the figures, the shutter 44 is kept urged in the rest position by the action of the spring 62, but, in the normal operation of the apparatus, the spring 62 can be omitted, and there can be utilized the pressure applied by the protection gas in the seat 20 at the portion 46, thanks to suitable openings not shown in the figures. The shutter 44 mechanically shields the first communication conduit 18 and moreover the transversal hollow 54 of the body 45 is in correspondence with the checking direction, and the movable closing element 55, under the action of the thrust device 56, partially protrudes from the hollow 54 and is pressed against the inlet of the axial communication conduit 34, in particular against the annular sealing gasket 35. Thus, in addition to the shielding effect of the shutter 44 which prevents chips and other foreign material from reaching the glass 13 of the light source 12, the cooperation between the ball 55 and the annular sealing gasket 35 provides fluid tightness or seal, protecting the optics against cooling splashes and dripping present in the working environment.

When the optoelectronic apparatus 1 must carry out a check, the shutter 44 is displaced, for example by means of a pneumatic system which sends compressed air into the longitudinal internal seat 20 of the shell 22 through the additional 19, from the rest position to the working position defined by the abutment between the abutment end portion 46 and an inner surface of the shell 22 that, in the arrangement of FIGS. 2 and 3, is shown at the top. Under the effect of the compressed air pushing the shutter to translate, the cooperation between the annular sealing gasket 35 and the ball 55 causes the spring 56 to yield and the ball 55 to re-enter the transversal hollow 54. In such a way, in the situation shown in FIG. 2 the ball 55 rests against the inner wall of the seat 20, pressed by the spring 56. In the working position of the shutter 44, the transversal through hole 60 is aligned with the first 18 and the second 26 communication conduit and with the axial communication conduit 34 along the checking direction of the apparatus, so as to allow the light beam 7 emitted by the source 12 to pass through. In addition, in this working position the oblique holes 59 and 61 are in communication with the feeding conduits 30 and 31 through which a shielding gas is introduced, typically compressed air, conveyed by suitable pneumatic circuits present in the casing 11 of the emitter 6. The shielding gas passes through the feeding conduits 30 and 31, the oblique holes 59 and 61 and the terminal part of the transversal through hole 60 and is thus conveyed towards the axial communication conduit 34 of the nozzle 33 from which it gets out to provide the protection flow which during the operation of the apparatus prevents dirt and other foreign matter to get into the emitter 6.

A protection device, or shutter assembly, 16 with the same characteristics of the device 15 described above, can be included in the receiver 8, as schematically shown in FIG. 1.

The protection device 16 represents a mechanically simple solution that is very effective to guarantee a suitable protection under any circumstances, even when, in the absence of power supply in the non-operational condition or due to unexpected power failures, the air flow is inactive, and the shielding provided by the shutter is not sufficient to guarantee a liquid-tight seal, for instance to avoid that the refrigerant present in the workshop environment gets into the optical device.

Various alternative embodiments with respect to that shown in the figures and described above are possible within the scope of the present invention.

The transversal hollow 54 can for example be oriented in the opposite direction with respect to that described and shown in the drawings, or with the end closed by the part of the nozzle 33 and the movable closing element 55 being such to cooperate, in the rest position with a sealing gasket at the mouth or inlet of the communication conduit 18. The preferred solution, however, is the one shown in the figures, which provides the seal at the nozzle 33, also preventing liquids from accessing the seat 20.

A nozzle such as that described in the aforementioned patent application EP-A-2207643 can be provided, with further conduits to generate a protection flow substantially similar to the tubular screen described in that patent publication.

The embodiment described up to now with reference to figure refers to an optoelectronic apparatus 1 in which the interruption of a light beam, typically a laser beam, is detected and signaled. In a different embodiment of the present invention, the optoelectronic apparatus is of a different kind, for example of the shadow casting type, with a known "CCD" ("Charge Coupled Device") type sensor present in the receiver for detecting variations in the features of the light beam received, in particular to acquire a shadow cast of a tool and carry out measurements and checks of different types.

The substantially cylindrical shape of the transversal hollow 54 and the spherical shape of the movable closing element 55 are advantageous and guarantee a particularly reliable operation. However, also solutions in which said hollow and closing element have different shapes but anyway guarantee the seal in the rest position and the return of the closing element into the seat 20 when passing to the working position fall within the scope of the present invention.

The invention claimed is:

1. An optoelectronic apparatus for checking dimensions, position or integrity of mechanical parts with
    optical devices comprising an emitter and a receiver which are aligned along a checking direction and are adapted to emit and receive, respectively, a light beam,
    a sensor adapted to detect variations in the features of the light beam as received, and
    a protection device for at least one of said optical devices, the protection device comprising a support element with an internal seat, communication conduits aligned along the checking direction, and a shutter which is arranged in said internal seat of the support element, can be displaced from a rest position to a working position and has a transversal through hole adapted to be arranged substantially along the checking direction at said working position,
    wherein the shutter further comprises
    a transversal hollow, having an open end, adapted to be arranged substantially along the checking direction at said rest position,
    a movable closing element arranged in said transversal hollow, and
    a thrust device adapted to thrust the movable closing element to come out from the transversal hollow through the open end, in the rest position the movable closing element being pressed against the inlet of one of said communication conduits.

2. The optoelectronic apparatus according to claim 1, wherein the protection device comprises an annular sealing gasket at said inlet of one of said communication conduits, in the rest position the movable closing element being pressed against the annular sealing gasket.

3. The optoelectronic apparatus according to claim 1, wherein the support element comprises feeding conduits in communication with the internal seat and with a source of protection gas, the protection device comprising a nozzle with an axial communication conduit, said communication conduits comprising said axial communication conduit.

4. The optoelectronic apparatus according to claim 3, wherein the shutter further comprises oblique holes that converge into the transversal through hole and, in the working position, are in communication with the feeding conduits to convey the protection gas to the axial communication conduit of the nozzle.

5. The optoelectronic apparatus according to claim 3, wherein in the rest position the movable closing element is pressed against the inlet of said axial communication conduit.

6. The optoelectronic apparatus according to claim 1, wherein the light beam is a laser beam, and the sensor is adapted to detect an interruption of the laser beam.

7. A protection device for an optical device adapted to emit or receive a light beam that defines a checking direction, comprising a support element with an internal seat, communication conduits aligned along the checking direction, and a shutter which is arranged in said internal seat of the support element, can be displaced from a rest position to a working position, and has a transversal through hole adapted to be arranged substantially along the checking direction at said working position so as to allow the light beam to pass through, wherein the shutter further comprises
- a transversal hollow, having an open end, adapted to be arranged substantially along the checking direction at said rest position,
- a movable closing element arranged in said transversal hollow, and
- a thrust device adapted to thrust the movable closing element to come out from the transversal hollow through the open end, in the rest position the movable closing element being pressed against the inlet of one of said communication conduits.

8. The protection device according to claim 7, comprising an annular sealing gasket at said inlet of one of said communication conduits, in the rest position the movable closing element being pressed against the annular sealing gasket.

9. The protection device according to claim 7, wherein the support element comprises feeding conduits in communication with the internal seat and with a source of compressed air, and comprising a nozzle with an axial communication conduit, said communication conduits comprising said axial communication conduit, in the rest position the movable closing element being pressed against the inlet of said axial communication conduit.

10. The protection device according to claim 9, wherein the shutter further comprises oblique holes that converge in the transversal through hole and in the working position are in communication with the feeding conduits to convey the compressed air to the axial communication conduit of the nozzle.

* * * * *